United States Patent
Liu et al.

(10) Patent No.: US 7,970,083 B2
(45) Date of Patent: Jun. 28, 2011

(54) ESTIMATING DOPPLER FREQUENCY IN ISDB-T SYSTEMS

(75) Inventors: Li Liu, Alisa Viejo, CA (US); Yongru Gu, Lake Forest, CA (US); Jun Ma, Shaanxi (CN)

(73) Assignee: Newport Media, Inc., Lake Forest, CA (US)

( * ) Notice: Subject to any disclaimer, the term of this patent is extended or adjusted under 35 U.S.C. 154(b) by 678 days.

(21) Appl. No.: 12/062,678

(22) Filed: Apr. 4, 2008

(65) Prior Publication Data

US 2009/0252263 A1    Oct. 8, 2009

(51) Int. Cl.
*H03D 1/00* (2006.01)
*H04L 27/06* (2006.01)

(52) U.S. Cl. .......................... 375/340; 342/99
(58) Field of Classification Search ............. 375/224, 375/259–260, 316, 340, 344, 343; 455/63.1, 455/67.11, 75, 192.1, 226.1; 342/99
See application file for complete search history.

(56) References Cited

U.S. PATENT DOCUMENTS

| | | | | |
|---|---|---|---|---|
| 6,563,861 | B1 * | 5/2003 | Krasny et al. | 375/150 |
| 6,680,969 | B1 * | 1/2004 | Molnar et al. | 375/224 |
| 6,922,452 | B2 * | 7/2005 | Sandberg | 375/346 |
| 7,054,394 | B2 * | 5/2006 | Moser | 375/343 |
| 7,076,379 | B2 * | 7/2006 | Lee et al. | 702/75 |
| 7,257,408 | B2 * | 8/2007 | Kikuchi et al. | 455/452.2 |
| 2004/0125012 | A1 * | 7/2004 | Okamura et al. | 342/81 |
| 2006/0079184 | A1 * | 4/2006 | Do et al. | 455/63.1 |

* cited by examiner

*Primary Examiner* — Jean B Corrielus
(74) *Attorney, Agent, or Firm* — Rahman LLC

(57) ABSTRACT

A technique for estimating maximum Doppler frequency of a wireless signal in a wireless communication system, wherein the method comprises receiving a wireless signal; determining an impulse response of the received wireless signal; determining an auto-correlation function (ACF) value of the impulse response of the received wireless signal; determining a power spectrum density of said received wireless signal based on the ACF value; and selecting an algorithm for performing demodulation of the received wireless signal by utilizing the determined power spectrum density.

20 Claims, 7 Drawing Sheets

ESTIMATING DOPPLER FREQUENCY IN ISDB-T SYSTEMS

BACKGROUND

1. Technical Field

The embodiments herein generally relate to Integrated Services Digital Broadcasting-Terrestrial (ISDB-T) systems, and, more particularly, to techniques for improving reception of signals in an ISDB-T system.

2. Description of the Related Art

In recent years, the wireless industry has seen explosive growth in device capability, especially in relation to mobile devices, such as cell phones, handhelds, gaming consoles, etc. Ever-increasing demand for computing power, memory, and high-end graphic functionalities has accelerated the development of new and exciting wireless services. In the last few years, multiple technologies have been proposed to address delivery of streaming multimedia to mobile devices.

Multimedia communications provide a rich and immediate environment of image, graphics, sound, text, and interaction through a range of technologies. An example of multimedia communication is streaming multimedia, which is primarily a delivery of continuous synchronized media data. The streaming multimedia is constantly received by, and displayed to, an end user while it is being delivered by a service provider. Multiple technologies such as ISDB-T, Terrestrial-Digital Multimedia Broadcasting (T-DMB), Satellite-Digital Multimedia Broadcasting (S-DMB), Digital Video Broadcasting—Handheld (DVB-H), and FLO (Forward Link Only) are used to address the delivery of streaming multimedia to mobile devices. These technologies have typically leveraged upon either third generation cellular/PCS or digital terrestrial TV broadcast technologies.

ISDB, as the name suggests, is used for digital transmission and reception of integrated services, such as television, audio and data services. ISDB includes a variety of transmission standards for broadcasting of satellite, terrestrial, and cable signals. The ISDB transmission system utilized for broadcasting terrestrial digital television signals is termed as ISDB-T.

The ISDB-T system is based on Orthogonal Frequency Division Multiplexing (OFDM). A number of OFDM segments may constitute a plurality of transmission bands in the ISDB-T transmission system. The ISDB-T system is enabled to individually set operating parameters of each OFDM segment, thereby enabling a formation of flexible channels. Furthermore, signals in the ISDB-T system are transmitted in the form of symbols having different number of bits based upon the modulation system being used. An OFDM frame consists of 204 symbols having a sufficient guard interval in between to prevent inter-symbol interference effects. Moreover, the ISDB-T system utilizes Moving Pictures Expert Group-2 (MPEG-2) video coding and MPEG-2 Advanced Audio Coding (AAC), thereby enabling a simultaneous transmission of audio, video, and data. The audio, video, and data may be multiplexed to form a single transport scheme for transmission to the receiver. Additionally, a Transmission Multiplexing Configuration Control (TMCC) signal is transmitted with the multiplexed data to other information such as channel segment configuration and transmission parameters.

Conventionally, the ISDB-T system features three transmission modes, referred to as Mode 1, Mode 2, and Mode 3. Each OFDM segment of the three modes has different number of carriers, thereby enabling the use of wide range of transmitting frequencies for the system. Additionally, the ISDB-T system may be utilized to provide high quality and reliable video, audio, and data broadcasting for fixed as well as mobile receivers. Accordingly, it is desirable to have a quality reception while the receiver is in motion. Further, to achieve good reception of ISDB-T signals at higher speeds, the receiver must estimate operating parameters of the transmission channel. One such operating parameter is maximum Doppler frequency, also known as Doppler spread. An estimation of the Doppler spread may enable "tweaking" of a tuned demodulator of the mobile receiver to achieve a better reception of the ISDB-T signal at higher speeds.

SUMMARY

In view of the foregoing, an embodiment herein provides a method for estimating maximum Doppler frequency of a wireless signal in a wireless communication system, and a program storage device, readable by a computer, tangibly embodying a program of instructions executable by the computer to perform the method for estimating maximum Doppler frequency of a wireless signal in a wireless communication system, wherein the method comprises receiving a wireless signal; determining an impulse response of the received wireless signal; determining an auto-correlation function (ACF) value of the impulse response of the received wireless signal, wherein the ACF value is determined by utilizing:

$$ACF(l) = \frac{\sum_n h(n) h*(l-n)}{\|h(n)\|},$$

wherein l is a symbol interval, ACF(l) is said autocorrelation function of the impulse response with a lag of l, h(n) is the impulse response of the received wireless signal at time interval n, and h*(l−n) is a complex conjugate of the impulse response h(n); determining a power spectrum density of the received wireless signal based on the ACF value, wherein the power spectrum density function is determined by utilizing:

$$PSD(k) = FFT(ACF(l)) = \sum_{l=-64}^{64} ACF(l)e^{-j2\pi lk},$$

wherein k is a frequency band of the received wireless signal; and selecting an algorithm for performing demodulation of the received wireless signal by utilizing the determined power spectrum density.

Additionally, utilizing the determined power spectrum density may further comprise determining a maximum Doppler frequency from a power spectrum for improving reception of the wireless signal in said wireless communication system. Preferably, the wireless communication system comprises an ISDB-T system. Preferably, the improved reception of the wireless signal in the wireless communication system occurs when the maximum Doppler frequency is greater than 100 Hz.

Another embodiment includes a method for estimating maximum Doppler frequency of a wireless signal in a wireless communication system, and a program storage device, readable by a computer, tangibly embodying a program of instructions executable by the computer to perform the method for estimating maximum Doppler frequency of a wireless signal in a wireless communication system, wherein the method comprises receiving a wireless signal; determining autocorrelation function (ACF) values for the received wireless signal, wherein said ACF values are determined for two consecutive time intervals of said received wireless signal; estimating a ratio of the determined ACF values; determining a value of a maximum Doppler frequency for the received signal from a predetermined lookup table by utilizing the estimated ratio of the determined ACF values; and selecting an algorithm for performing demodulation of said received wireless signal by utilizing the determined maximum Doppler frequency.

Preferably, the predetermined lookup table comprises a plurality of values for a ratio between autocorrelation function (ACF) values for consecutive time intervals, and wherein the ratio is estimated for a plurality of maximum Doppler frequency values by utilizing:

$$\text{Bessel Ratio}(f_{d,max}) = \frac{ACF(2)}{ACF(1)} = \frac{J_o\left(2\pi f_{d,max} \frac{v}{\lambda} \times 2\right)}{J_o\left(2\pi f_{d,max} \frac{v}{\lambda}\right)},$$

wherein ACF(1) and ACF(2) are two adjacent ACF values, Jo is a zeroth order Bessel function of a first kind, $f_{d,max}$ is the maximum Doppler frequency, v is a mobility speed of a receiver of the received wireless signal, and λ is a carrier wavelength of the received wireless signal.

Preferably, the wireless system comprises an ISDB-T system. Moreover, using the maximum Doppler frequency, $f_{d,max}$, improves reception of the wireless signal in the wireless communication system. Preferably, the improved reception of the wireless signal in the wireless communication system occurs when the maximum Doppler frequency is less than or equal to 100 Hz.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1B:
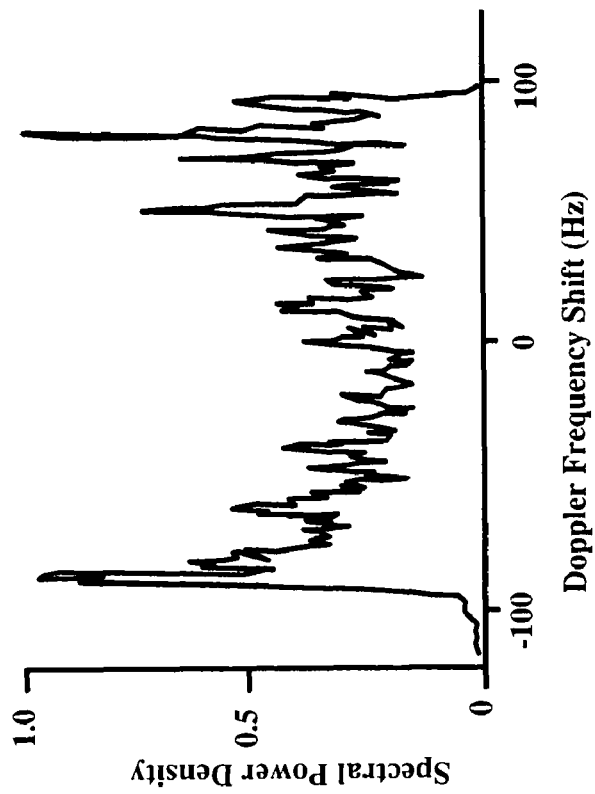
FIGS. 1A and 1B are graphical illustrations representing the power spectrum density of a typical high mobility receiver in an ISDB-T system in accordance with the embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide techniques for improving reception in a receiver of an ISDB-T system. More specifically, the embodiment described herein involve estimation of maximum Doppler frequency for a wireless signal received by the receiver of the ISDB-T, such that the maximum Doppler frequency is utilized to improve the reception of the wireless signal in the receiver of the ISDB-T system. Referring now to the drawings, and more particularly to FIGS. 1A through 6, where similar reference characters denote corresponding features consistently throughout the figures, there are shown preferred embodiments.

Figure 1A:
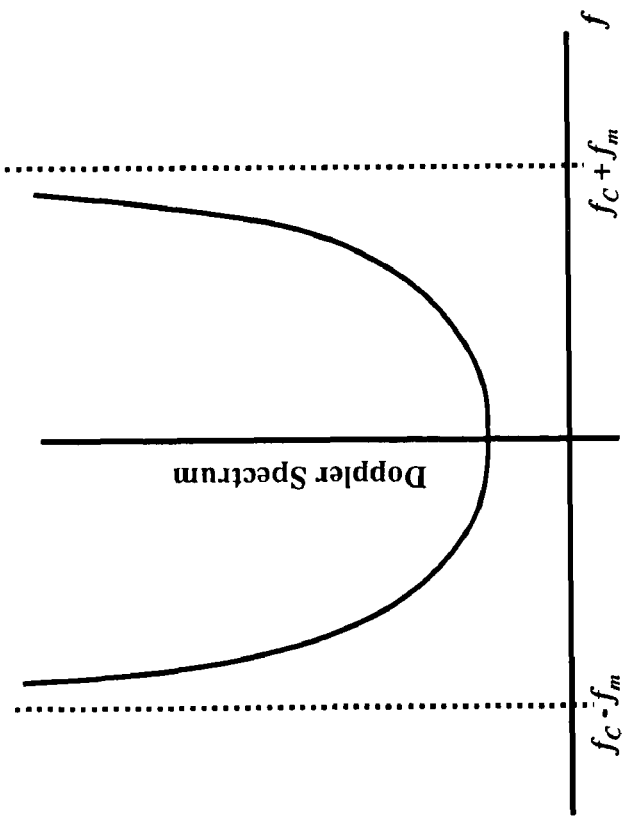

ISDB-T systems may utilize fixed as well as mobile receivers. Motion of mobile receiver results in creation of time varying channels. Such time varying channels are also known as Rayleigh fading channels, in which the signal varies randomly or fades according to a Rayleigh distribution. A power spectrum density of the time varying channel is called Doppler spectrum. FIGS. 1A and 1B illustrate graphs representing the power spectrum density of a high mobility receiver in an ISDB-T system. More specifically, FIGS. 1A and 1B illustrate a Doppler spectrum of Rayleigh Fading channel in a high mobility receiver. The graph of the FIG. 1A illustrates the Doppler spectrum of an ideal Rayleigh fading channel while the graph of the FIG. 1B illustrates the Doppler spectrum for an exemplary practical Rayleigh fading channel. More specifically, the graph of FIG. 1B is based on actual measurements of the Doppler spectrum.

The Doppler spectrum in the graphs of FIGS. 1A and 1B are in the frequency domain. Accordingly, there exists a maximum frequency for the Doppler spectrum, known as maximum Doppler Frequency ($f_{d,max}$). A determination of the maximum Doppler frequency is critical for improving the reception of the high mobility receiver of the ISDB-T system. Accordingly, the embodiments herein provide methods for estimating the maximum Doppler frequency for the high mobility receiver of the ISDB-T system for improving the reception of the receiver.

Figure 2:
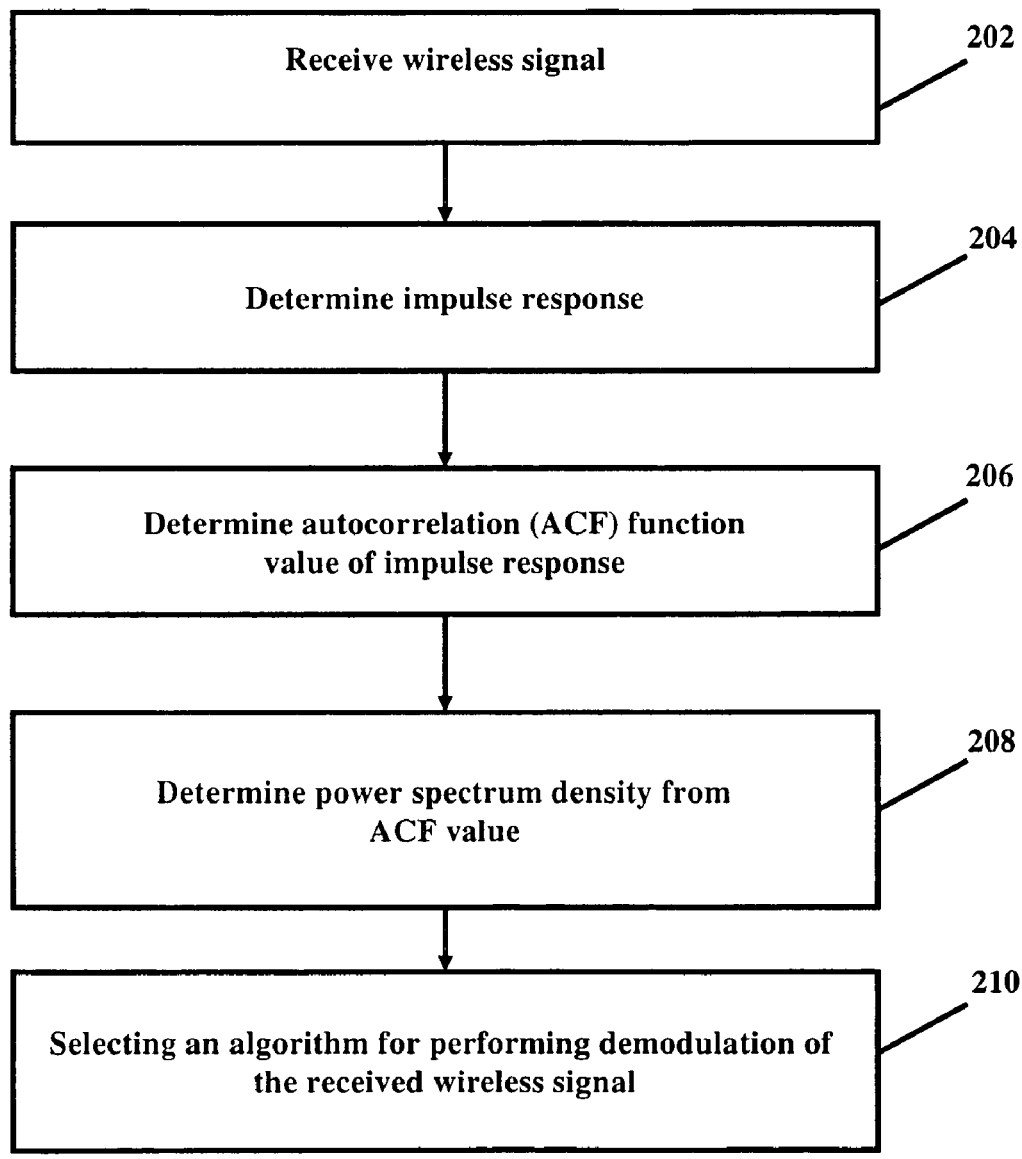
FIG. 2 is a flow diagram illustrating a method for estimating maximum Doppler frequency of a wireless signal in an ISDB-T system in accordance with a first embodiment herein.

FIG. 2 illustrates a flow diagram of a method for improving reception in an ISDB-T system in accordance with a first embodiment herein. The method of FIG. 2 may be implemented in a receiver of the ISDB-T system. At step 202, the receiver of the ISDB-T system receives a wireless signal, such as an ISDB-T signal. Furthermore, at step 204, the receiver determines the impulse response of the wireless channel using the received wireless signal for further processing. The frequency response of the wireless channel impulse response is first estimated in the frequency domain after taking the Fast Fourier Transform (FFT) of the received wireless signal. The estimated frequency response is then transformed back to the time domain through an inverse FFT (IFFT) operation to obtain the corresponding impulse response of the wireless channel. The impulse response is mathematically represented as h(n), where n is a time index of the wireless signal in digital domain.

Thereafter, at step 206, based upon the impulse response h(n), the receiver determines an autocorrelation function (ACF) value of the wireless channel impulse response. More specifically, the ACF value of the wireless channel impulse response may be determined by utilizing the following equation (1):

$$ACF(l) = \frac{\sum_n h(n)h*(l-n)}{\|h(n)\|} \quad (1)$$

where l is an interval between symbols of the received wireless signal, ACF(l) is the autocorrelation function of the wireless channel impulse response considered with a lag of l, h(n) is the impulse response of the input signal, and h*(l−n) is the complex conjugate of the impulse response h(n). The denominator component of the equation (1) is provided for normalization thereof.

Subsequently, at step 208, the receiver determines a power spectrum density of the received wireless signal to obtain a Doppler spectrum for the received wireless signal. More specifically, the receiver determines a Fast Fourier Transform (FFT) of the ACF value of the received wireless signal based upon the following equation (2):

$$PSD(k) = FFT(ACF(l)) = \sum_{l=-64}^{64} ACF(l)e^{-j2\pi lk} \quad (2)$$

where k is the frequency band of the received wireless signal.

Moreover, at step 210, the receiver utilizes the Doppler spectrum determined by the receiver for estimating the maximum Doppler frequency for the received wireless signal. The maximum Doppler frequency can be estimated by setting a threshold on the estimated Doppler spectrum. The minimum frequency in absolute value, such that its corresponding Doppler spectrum value exceeds this value, is taken as an estimate of the maximum Doppler frequency. The threshold may be programmable and can be set and calibrated through external registers (not shown). Based upon the determination of the maximum Doppler frequency determined in step 210, the receiver may select a suitable algorithm for demodulation of the received wireless signal.

There are two suites of algorithms that are used in the ISDB-T receiver. One suite of algorithms, suite 1 algorithms, is suitable for channels with low Doppler frequency; The other suite of algorithms, suite 2 algorithms, is suitable for channels with high Doppler frequency. Based on the value of the estimated maximum Doppler frequency, a threshold is chosen such that if the maximum Doppler frequency is below this threshold, suite 1 algorithms will be chosen; otherwise, suite 2 algorithms will be chosen. Suite 1 algorithms involve both time-domain and frequency domain interpolations during a channel equalization process. While suite 2 algorithms bypass the time-domain interpolation and only involve frequency domain interpolation that offers better performance for high Doppler channel but only works for short channel delay spread. Accordingly, the reception of the wireless signal by the receiver may be improved. Suite 2 algorithms bypass the time-domain interpolation that eliminates the noisy effects on the channel estimation in the case of high Doppler channel condition, which improves the performance. The requirement of bypassing the time-domain interpolation limits the channel impulse response length to be within certain range so it is suitable for relative short channels only.

In a first embodiment, the method of FIG. 2 may be implemented in the hardware of the receiver in the form of a computer program. The computer program may include instructions for receiving the wireless signal at the receiver and for determining the impulse response of the received wireless signal. The computer program may further include instructions for determining the ACF value of the impulse response of the received wireless signal. Furthermore, the computer program may have instructions for determining the power spectrum density of the received wireless signal based upon the determined ACF value. Moreover, the computer program may have instructions for utilizing the determined power spectrum density. The computer program may further include instructions for estimating the maximum Doppler frequency value for the received wireless signal from the determined power spectrum density for improving the reception of the receiver by selecting an appropriate suite of algorithm, such as suite 1 algorithm or suite 2 algorithm, for demodulation of the received wireless signal. A hardware system for implementing the computer program, as described herein, is described in conjunction with FIG. 6 below.

Figure 3:
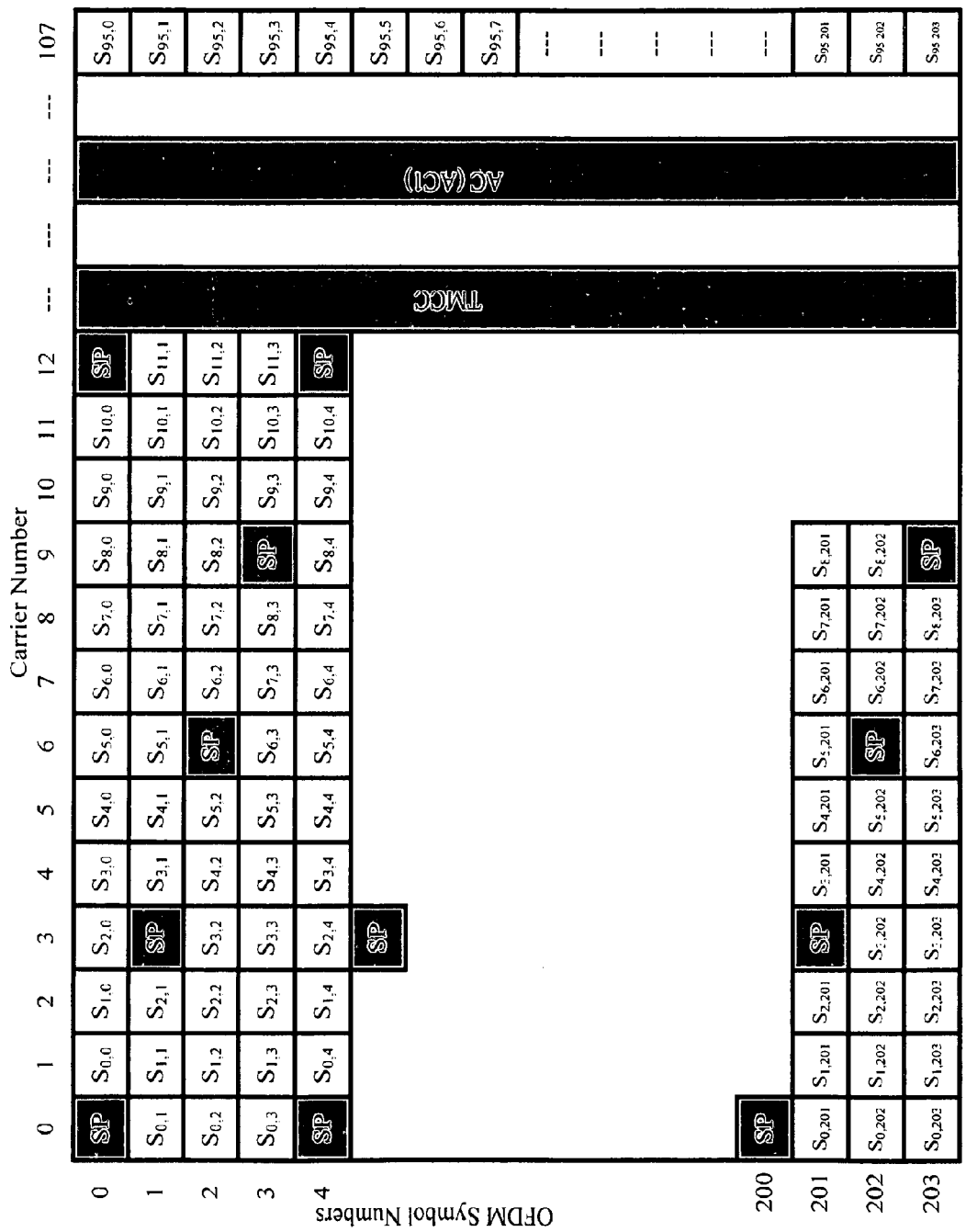
FIG. 3 is a schematic diagram of a frame structure of an ISDB-T system used in accordance with the embodiments herein.

Also, the receiver may utilize the TMCC bins in the ISDB-T frame structure for determination of the impulse response h(n) of the received wireless signal. The frame structure of an ISDB-T system is shown in FIG. 3 and comprises four TMCC bins for a Mode 3 transmission. The receiver may estimate an impulse response for each of the four TMCC bins and determine an average thereof for obtaining a better estimate of the impulse response h(n) for the receiver. Furthermore, the receiver may utilize a 128-point FFT module for determining the Doppler spectrum according to equation (2) of the method of FIG. 2.

Moreover, since the ACF of the impulse response is an even function, the receiver may be required to determine only 64-point ACF values for generating a 128-point ACF value. The 64-point ACF values may be stored in a memory module for further processing and the stored values may be utilized by the hardware (not shown) of the receiver, such as a processor, whenever required for generating the 128-point FFT as described herein. The advantage offered by use of the 64-point ACF values is that the memory module utilized for storing the values need not be very large in size. For example, a 4-Kbits (Kb) Random Access Memory (RAM) may be utilized for storing the 64-point ACF values, thereby reducing the size of the system hardware. The 128-point FFT calculation can be performed either in hardware or on the host processor every 300 ms, which corresponds to the average software pulling time interval. The frequency resolution of the 128-point FFT is approximately 7 Hz. Accordingly, the implementation of the method of FIG. 2, as described herein, improves the reception of the received wireless signal without increasing the hardware complexity of the receiver system.

Figure 4:
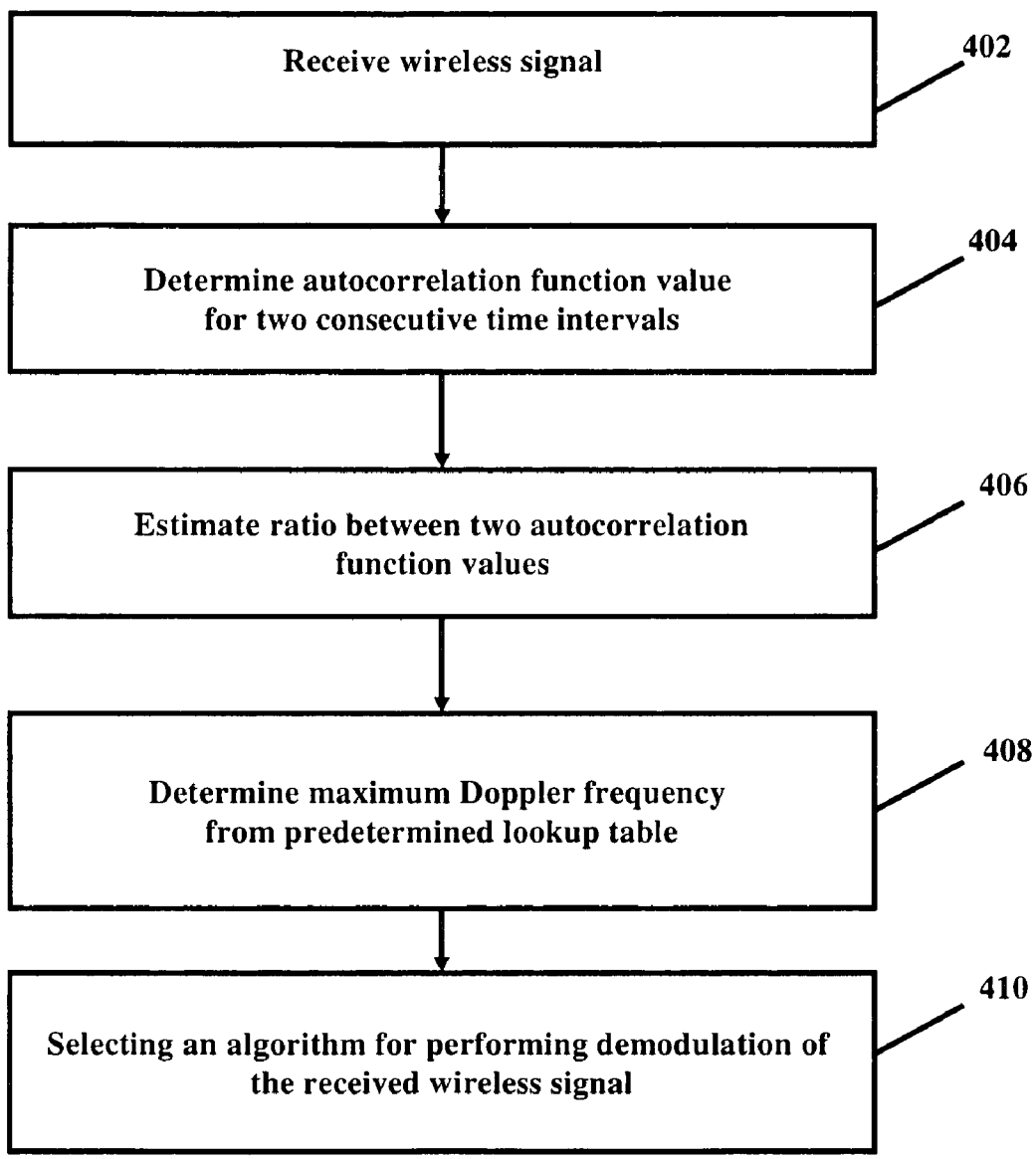
FIG. 4 is a flow diagram illustrating a method for estimating maximum Doppler frequency of a wireless signal in an ISDB-T system in accordance with a second embodiment herein.

FIG. 4 illustrates a method for improving reception in an ISDB-T system in accordance with a second embodiment herein. The method may be utilized in a receiver of the ISDB-T system for improving the reception of the ISDB-T signal at the receiver. The method of FIG. 4 involves a Bessel Function to determine the maximum Doppler frequency for the received wireless signal. More specifically, for a Rayleigh channel the power spectrum density of the received wireless signal may be estimated by utilizing the following equation (3):

$$PSD(f) = \frac{1}{\sqrt{1 - \frac{(f - f_c)^2}{f_{d,max}^2}}} \qquad (3)$$

where $f_c$ is the carrier frequency of the received wireless signal. Moreover, a corresponding autocorrelation function of the received wireless signal may be determined according to equation (4):

$$ACF(l) = J_o\left(2\pi f_{d,max} \frac{v}{\lambda} l\right) \qquad (4)$$

where $J_o$ is the zeroth order Bessel Function of the first kind, $v$ is the mobility speed of the receiver, $\lambda$ is the carrier wavelength of the received wireless signal, $f_{d,max}$ is the maximum Doppler frequency and $l$ is the interval between symbols of the received wireless signal. Accordingly, the ACF value varies with the $f_{d,max}$ value for the received wireless signal. Moreover, for a Rayleigh fading channel, there is a one-to-one correspondence between the ratio of adjacent ACF values for the received wireless signal and the $f_{d,max}$ value. The ratio of adjacent ACF values for the received wireless signal is also known as the Bessel Ratio, which may be described by equation (5):

$$\text{Bessel Ratio}(f_{d,max}) = \frac{ACF(2)}{ACF(1)} = \frac{J_o\left(2\pi f_{d,max} \frac{v}{\lambda} \times 2\right)}{J_o\left(2\pi f_{d,max} \frac{v}{\lambda}\right)} \qquad (5)$$

where ACF(1) and ACF(2) represent exemplary adjacent ACF values for the signal, $v$ is the mobility speed of the receiver, and $\lambda$ is the carrier wavelength of the received wireless signal.

The method of FIG. 4 contemplates preparation of a lookup table having values of the Bessel ratio for different values of $f_{d,max}$. More specifically, the lookup table may be generated by utilizing equation (5). The use of the lookup table is described below with respect to FIG. 4. At step 402, the wireless signal such as an ISDB-T signal, is received at the receiver. Next, at step 404, the receiver determines the ACF values for two consecutive time (OFDM symbol) intervals (one time interval is equal to one OFDM symbol length) between the symbols of the wireless signal by utilizing equation (1). It will be evident to a person skilled in the art that the consecutive time intervals utilized to determine the autocorrelation values are same as the time intervals for which the lookup table has been prepared.

Based upon the determined autocorrelation values for two consecutive time intervals, the receiver, at step 406, estimates a ratio between the two consecutive ACF values, which is the Bessel ratio. Thereafter, at step 408, the receiver refers to the lookup table to determine a corresponding $f_{d,max}$ value for the estimated Bessel ratio value. The determined $f_{d,max}$ value is utilized by the receiver, at step 410, for selecting an appropriate demodulation algorithm for the received wireless signal, thereby improving the reception of the wireless signal.

Again, there are two suites of algorithms that are used in the ISDB-T receiver. One suite of algorithms, suite 1 algorithms, is suitable for channels with low Doppler frequency. The other suite of algorithms, suite 2 algorithms, is suitable for channels with high Doppler frequency. Based on the value of the estimated maximum Doppler frequency, a threshold is chosen such that if the maximum Doppler frequency is below this threshold, suite 1 algorithms will be chosen; otherwise, suite 2 algorithms will be chosen. Suite 1 algorithms involve both time-domain and frequency domain interpolations during a channel equalization process. While suite 2 algorithms bypass the time-domain interpolation and only involve frequency domain interpolation that offers better performance for high Doppler channel but only works for short channel delay spread. Accordingly, the reception of the wireless signal by the receiver may be improved. Suite 2 algorithms bypass the time-domain interpolation that eliminates the noisy effects on the channel estimation in the case of high Doppler channel condition, which improves the performance. The requirement of bypassing the time-domain interpolation limits the channel impulse response length to be within certain range so it is suitable for relative short channels only.

For practical implementation, the method of FIG. 4 involves using equations for calculation of consecutive ACF values, which may be estimated without requiring any complex circuitry. Moreover, the method of FIG. 4 involves generation of a lookup table of a Bessel ratio, which is stored in the receiver hardware. Practically, a small memory module may be utilized for storing the lookup table. For example, a small memory module, such as a RAM of approximately 1-kB size, may be utilized for storing a lookup table having 64 entries. Accordingly, the method of FIG. 4 provides an approach to improve a reception of the receiver in an ISDB-T system, which does not involve complex hardware circuitry.

Furthermore, the method of FIG. 4 may be implemented in the hardware of the receiver in the form of a computer program. The computer program may include software instructions for receiving the wireless signal at the receiver. The computer program may further include software instructions for determining the ACF values for two consecutive time intervals of the received wireless signal. Also, the computer program may include instructions for estimating the ratio of the determined ACF values. Moreover, the computer program may include software instructions for utilizing the estimated ratio of the determined ACF values to refer the lookup table for determining the maximum Doppler frequency for the received wireless signal. The computer program may also include instructions for utilizing the determined maximum Doppler frequency value for improving the reception of the receiver by selecting an appropriate suite of algorithms for demodulation of the received wireless signal. A hardware system for implementing the computer program, as described herein, is described in conjunction with FIG. 6 below.

Figure 5A:
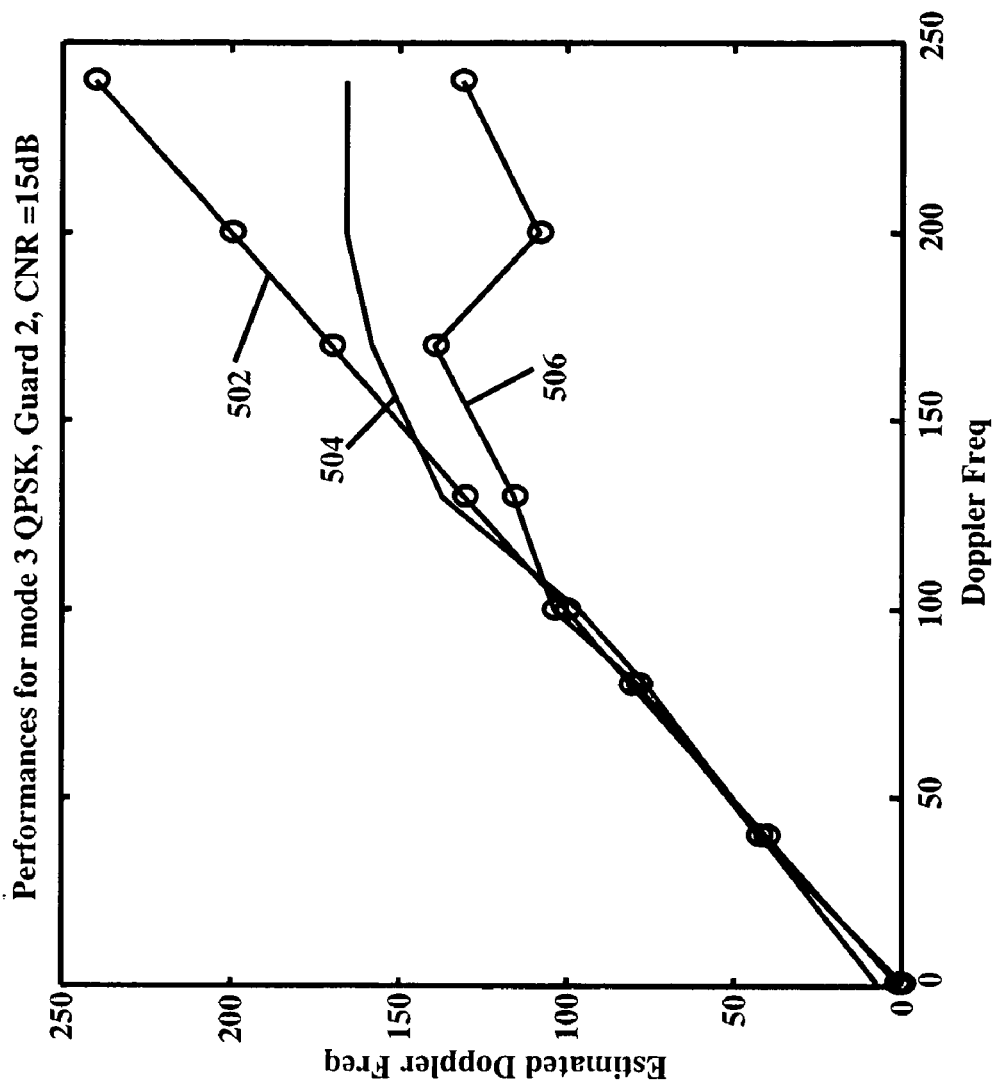
FIGS. 5A and 5B are graphical illustrations representing comparisons of the performance of the methods illustrated in FIGS. 2 and 4 in accordance with the embodiments herein.
Figure 5B:
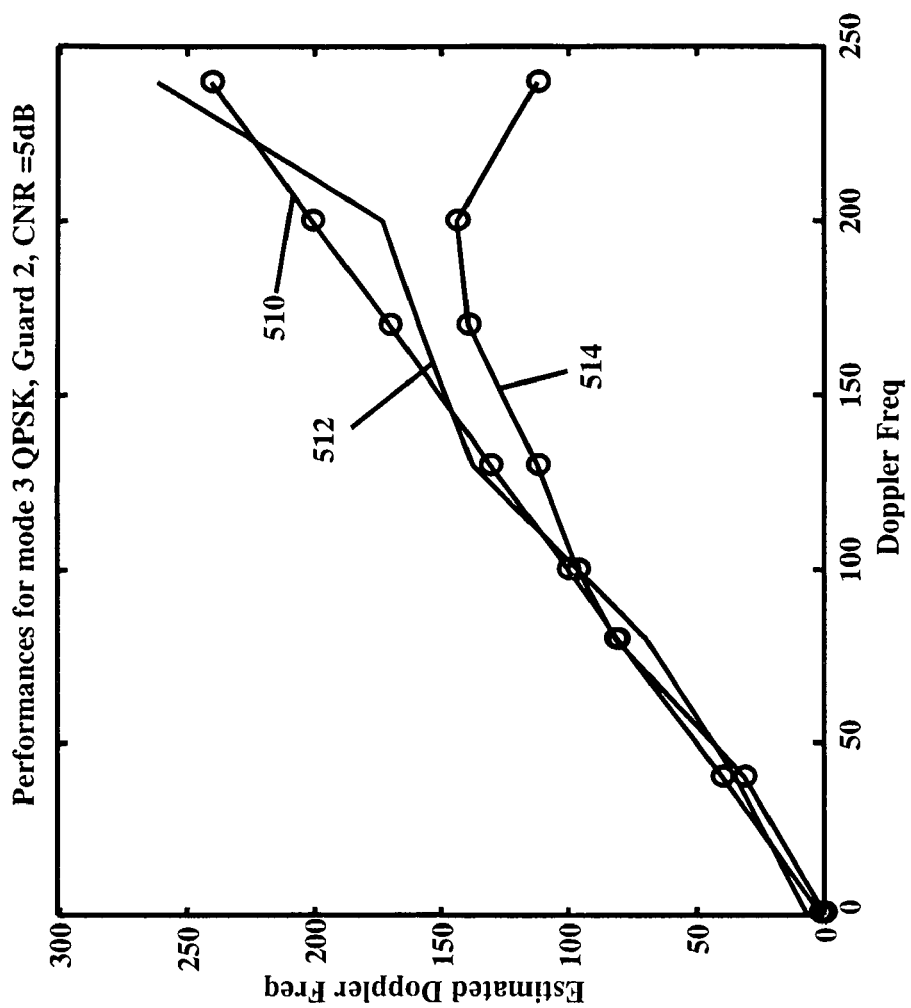

Accordingly, the embodiments herein provide two exemplary methods; i.e. the method of FIG. 2 and the method of FIG. 4, for improving the reception of the received wireless signal at an ISDB-T receiver. The two methods may be compared to each other on the basis of a performance thereof. The performance of the two methods of FIG. 2 (Method 1) and FIG. 4 (Method 2) may be defined as the accuracy with which the methods estimate the maximum Doppler frequency for the received wireless signal. More specifically, the performance may be defined as a comparison between a value of maximum Doppler frequency for the received wireless signal estimated by the methods of FIGS. 2 and 4, and an actual value of the maximum Doppler frequency for the received wireless signal. FIGS. 5A and 5B illustrate graphs depicting comparisons between the performance of the method of FIG. 2 (Method 1) and the method of FIG. 4 (Method 2).

Referring to FIG. 5A, the graph includes curves 502, 504, and 506, obtained for an ideal method, the method of FIG. 2 (Method 1), and the method of FIG. 4 (Method 2) respectively, utilized in a receiver of the ISDB-T system. The curves 502, 504, and 506 represent a comparison between the actual values of maximum Doppler frequency and the estimated values of maximum Doppler frequency obtained by utilizing one of the methods. More specifically, the curve 502 is a straight line representing an ideal method for which the actual value of the maximum Doppler frequency is same as the estimated value of maximum Doppler frequency. Further, the curve 504 depicts the performance of the method of FIG. 2 and the curve 506 depicts the performance of the method of FIG. 4. Furthermore, the curves 502, 504, and 506 are obtained for exemplary values of the maximum Doppler frequency, such that the x-axis of the graph represents a set of exemplary values for actual Doppler frequency and the y-axis of the graph represents exemplary values for Doppler frequency estimated by utilizing one of the methods (Method 1 or Method 2). Moreover, the curves 502, 504, and 506 have been obtained for a signal-to-noise (SNR) ratio of 15 decibels (dB).

It is evident from the graph of FIG. 5A that for a value of actual Doppler frequency lying below 100 Hz, the curve 506 exhibits a 10 Hz estimation error in the accuracy while the curve 504 depicts a 15 Hz estimation error in the accuracy. Furthermore, for a value of actual Doppler frequency lying above 100 Hz, the curve 504 exhibits a better performance as compared to the curve 506. Accordingly, for maximum Doppler frequency lying at or below 100 Hz, the method of FIG. 4 may be used as a preferable approach for high accuracy and achievable hardware design. Additionally, for maximum Doppler frequency lying above 100 Hz, the method of FIG. 2 may be utilized as a preferable approach for improved performance.

Similarly, the graph of FIG. 5B illustrates a comparative analysis between the methods of FIGS. 2 and 4 (Methods 1 and 2, respectively) for another set of exemplary value for the maximum Doppler frequency. As illustrated, the graph includes curves 510 representing a performance of an ideal method, a curve 512 representing a performance of the method of FIG. 2, and a curve 514 representing a performance of the method of FIG. 4. Additionally, the curves 510, 512, and 514 have been obtained for a SNR of 5 dB.

Accordingly, the graphs of FIGS. 5A and 5B depict a comparative study of the performance of the method of FIG. 2 and the method of FIG. 4 for a received wireless signal of different frequencies. Depending upon an operating frequency range of the received wireless signal, an appropriate method, such as the method of FIG. 2 or FIG. 4, may be chosen for improving the reception of the received signal.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multi-chip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of an entirely hardware embodiment, an entirely software embodiment or an embodiment including both hardware and software elements. The embodiments that are implemented in software include but are not limited to, firmware, resident software, microcode, etc.

As described above, the methods of FIGS. 2 and 3 described herein may take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
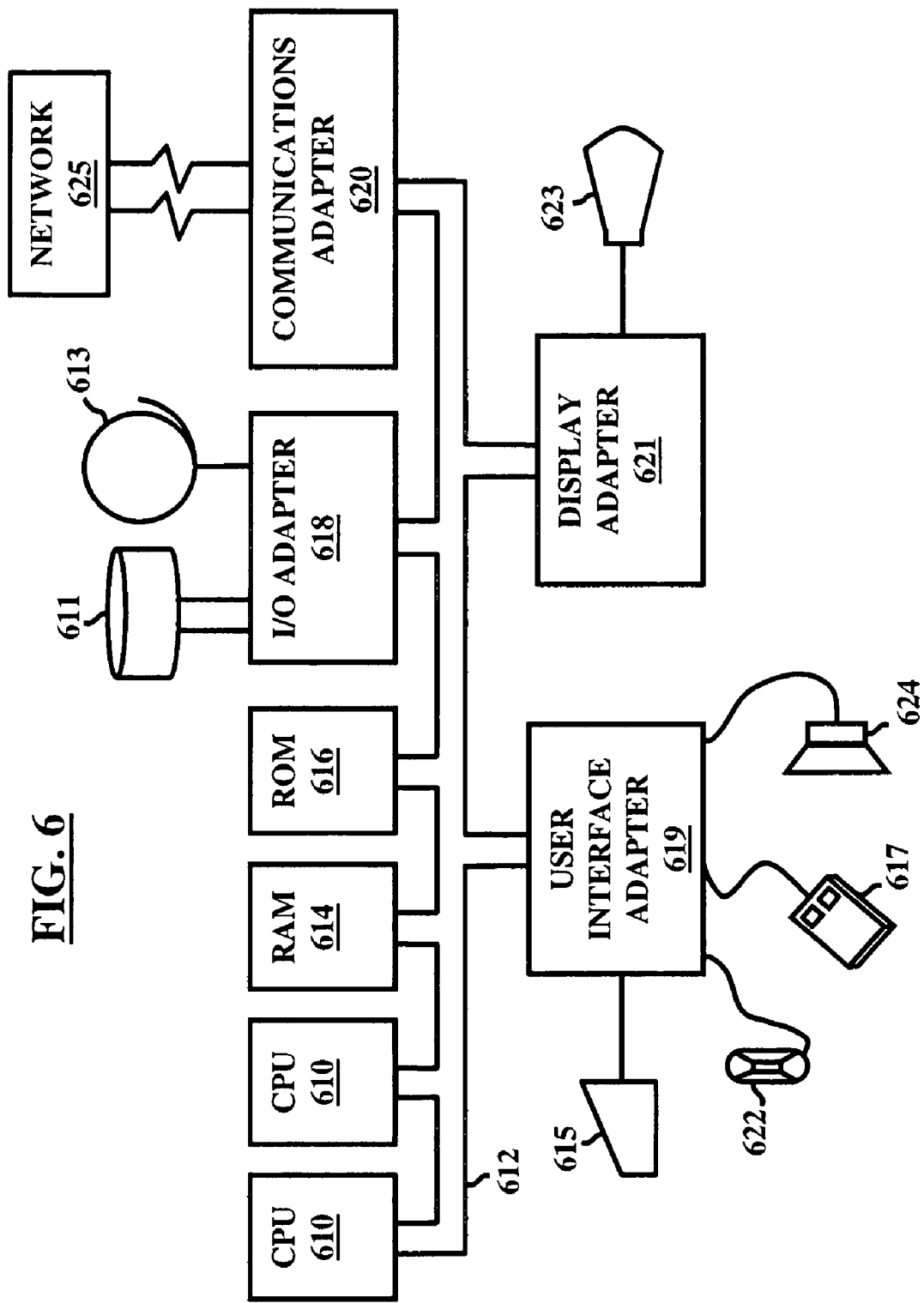
FIG. 6 illustrates a schematic diagram of a computer architecture used in accordance with the embodiments herein.

A representative hardware environment for practicing the embodiments herein is depicted in FIG. 6. This schematic drawing illustrates a hardware configuration of an information handling/computer system in accordance with the embodiments herein. The system comprises at least one processor or central processing unit (CPU) 610. The CPUs 610 are interconnected via system bus 612 to various devices such as a random access memory (RAM) 614, read-only memory (ROM) 616, and an input/output (I/O) adapter 618. The I/O adapter 618 can connect to peripheral devices, such as disk units 611 and tape drives 613, or other program storage devices that are readable by the system. The system can read the inventive instructions on the program storage devices and follow these instructions to execute the methodology of the embodiments herein. The system further includes a user interface adapter 619 that connects a keyboard 615, mouse 617, speaker 624, microphone 622, and/or other user interface devices such as a touch screen device (not shown) to the bus 612 to gather user input. Additionally, a communication adapter 620 connects the bus 612 to a data processing network 625, and a display adapter 621 connects the bus 612 to a display device 623 which may be embodied as an output device such as a monitor, printer, or transmitter, for example.

Accordingly, the methods as described herein provide approaches for improving the reception of a receiver of an ISDB-T system. More specifically, the methods, as described herein, may be utilized for improving reception of ISDB-T signals in a mobile ISDB-T receiver. Further, the methods provided according to the embodiments herein may be implemented without requiring overly complex circuitry in the receiver. Furthermore, implementation of the embodiments herein facilitates improved use of mobile television receivers.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method for using a wireless signal in a wireless communication system, said method comprising:
   receiving a wireless signal in a hardware-enabled receiver;
   determining an impulse response of the received wireless signal using said receiver;
   determining an auto-correlation function (ACF) value of said impulse response of said received wireless signal using said receiver, wherein said ACF value is determined by utilizing:

$$ACF(l) = \frac{\sum_n h(n) h*(l-n)}{\|h(n)\|},$$

wherein l is a symbol interval, ACF(l) is said autocorrelation function of said impulse response with a lag of l, h(n) is said impulse response of said received wireless signal at time interval n, and h*(l−n) is a complex conjugate of said impulse response h(n);

determining a power spectrum density of said received wireless signal based on said ACF value using said receiver, wherein said power spectrum density function is determined by utilizing:

$$PSD(k) = FFT(ACF(l)) = \sum_{l=-64}^{64} ACF(l)e^{-j2\pi lk},$$

wherein k is a frequency band of said received wireless signal, and wherein said FFT is a Fast Fourier Transform; and
   selecting an algorithm for performing demodulation of said received wireless signal by utilizing the determined power spectrum density.

2. The method of claim 1, wherein said utilizing the determined power spectrum density further comprises determining a maximum Doppler frequency from a power spectrum for improving reception of said wireless signal in said wireless communication system.

3. The method of claim 1, wherein said wireless communication system comprises an Integrated Services Digital Broadcasting-Terrestrial (ISDB-T) system.

4. The method of claim 2, wherein the improved reception of said wireless signal in said wireless communication system occurs when said maximum Doppler frequency is greater than 100 Hz.

5. The method of claim 1, wherein said hardware-enabled receiver comprises a hardware-enabled mobile receiver.

6. A method for estimating maximum Doppler frequency of a wireless signal in a wireless communication system, the method comprising:
   receiving the wireless signal;
   determining autocorrelation function (ACF) values for the received wireless signal, wherein said ACF values are determined for two consecutive time intervals of said received wireless signal;
   estimating a ratio of the determined ACF values;
   determining a value of the maximum Doppler frequency for the received signal from a predetermined lookup table by utilizing the estimated ratio of the determined ACF values; and
   selecting an algorithm for performing demodulation of said received wireless signal by utilizing the determined maximum Doppler frequency.

7. The method of claim 6, wherein said predetermined lookup table comprises a plurality of values for a ratio between autocorrelation function (ACF) values for consecutive time intervals, and wherein said ratio is estimated for a plurality of maximum Doppler frequency values by utilizing:

$$\text{Bessel Ratio}(f_{d,max}) = \frac{ACF(2)}{ACF(1)} = \frac{J_o\left(2\pi f_{d,max} \frac{v}{\lambda} \times 2\right)}{J_o\left(2\pi f_{d,max} \frac{v}{\lambda}\right)},$$

wherein ACF(1) and ACF(2) are two adjacent ACF values, $J_o$ is a zeroth order Bessel function of a first kind, $f_{d,max}$ is said maximum Doppler frequency, v is a mobility speed of a receiver of the received wireless signal, and λ is a carrier wavelength of the received wireless signal.

8. The method of claim 6, wherein said wireless system comprises an Integrated Services Digital Broadcasting-Terrestrial (ISDB-T) system.

9. The method of claim 7, wherein using said maximum Doppler frequency, $f_{d,max}$, improves reception of said wireless signal in said wireless communication system.

10. The method of claim 9, wherein the improved reception of said wireless signal in said wireless communication system occurs when said maximum Doppler frequency is less than or equal to 100 Hz.

11. The method of claim 6, further comprising receiving the wireless signal in a mobile receiver.

12. A non-transitory program storage device, readable by a computer, tangibly embodying a program of instructions executable by said computer to perform a method for using a wireless signal in a wireless communication system, said method comprising:
    receiving the wireless signal;
    determining an impulse response of the received wireless signal;
    determining an auto-correlation function (ACF) value of said impulse response of said received wireless signal, wherein said ACF value is determined by utilizing:

$$ACF(l) = \frac{\sum_n h(n)h*(l-n)}{\|h(n)\|},$$

wherein l is a symbol interval, ACF(l) is said autocorrelation function of said impulse response with a lag of l, h(n) is said impulse response of said received wireless signal at time interval n, and h*(l−n) is a complex conjugate of said impulse response h(n);
    determining a power spectrum density of said received wireless signal based on said ACF value, wherein said power spectrum density function is determined by utilizing:

$$PSD(k) = FFT(ACF(l)) = \sum_{l=-64}^{64} ACF(l)e^{-j2\pi lk},$$

wherein k is a frequency band of said received wireless signal, and wherein said FFT is a Fast Fourier Transform; and
    selecting an algorithm for performing demodulation of said received wireless signal by utilizing the determined power spectrum density.

13. The program storage device of claim 12, wherein said utilizing the determined power spectrum density further comprises determining a maximum Doppler frequency from a power spectrum for improving reception of said wireless signal in said wireless communication system.

14. The program storage device of claim 12, wherein said wireless communication system comprises an Integrated Services Digital Broadcasting-Terrestrial (ISDB-T) system.

15. The program storage device of claim 13, wherein the improved reception of said wireless signal in said wireless communication system occurs when said maximum Doppler frequency is greater than 100 Hz.

16. A non-transitory program storage device, readable by a computer, tangibly embodying a program of instructions executable by said computer to perform a method for estimating maximum Doppler frequency of a wireless signal in a wireless communication system, the method comprising:
    receiving the wireless signal;
    determining autocorrelation function (ACF) values for the received wireless signal, wherein said ACF values are determined for two consecutive time intervals of said received wireless signal;
    estimating a ratio of the determined ACF values;
    determining a value of the maximum Doppler frequency for the received signal from a predetermined lookup table by utilizing the estimated ratio of the determined ACF values; and
    selecting an algorithm for performing demodulation of said received wireless signal by utilizing the determined maximum Doppler frequency.

17. The program storage device of claim 16, wherein said predetermined lookup table comprises a plurality of values for a ratio between autocorrelation function (ACF) values for consecutive time intervals, and wherein said ratio is estimated for a plurality of maximum Doppler frequency values by utilizing:

$$\text{Bessel Ratio}(f_{d,max}) = \frac{ACF(2)}{ACF(1)} = \frac{J_o\left(2\pi f_{d,max}\frac{v}{\lambda} \times 2\right)}{J_o\left(2\pi f_{d,max}\frac{v}{\lambda}\right)},$$

wherein ACF(1) and ACF(2) are two adjacent ACF values, $J_o$ is a zeroth order Bessel function of a first kind, $f_{d,max}$ is said maximum Doppler frequency, v is a mobility speed of a receiver receiving the wireless signal, and λ is a carrier wavelength of the received wireless signal.

18. The program storage device of claim 16, wherein said wireless system comprises an Integrated Services Digital Broadcasting-Terrestrial (ISDB-T) system.

19. The program storage device of claim 17, wherein using said maximum Doppler frequency, $f_{d,max}$, improves reception of said wireless signal in said wireless communication system.

20. The program storage device of claim 19, wherein the improved reception of said wireless signal in said wireless communication system occurs when said maximum Doppler frequency is less than or equal to 100 Hz.

* * * * *